(12) United States Patent
Braness et al.

(10) Patent No.: US 9,143,812 B2
(45) Date of Patent: Sep. 22, 2015

(54) ADAPTIVE STREAMING OF MULTIMEDIA

(75) Inventors: Jason Braness, San Diego, CA (US); Kourosh Soroushian, San Diego, CA (US)

(73) Assignee: Sonic IP, Inc., Santa Clara, CA (US)

( * ) Notice: Subject to any disclaimer, the term of this patent is extended or adjusted under 35 U.S.C. 154(b) by 51 days.

(21) Appl. No.: 13/537,254

(22) Filed: Jun. 29, 2012

(65) Prior Publication Data

US 2014/0006635 A1    Jan. 2, 2014

(51) Int. Cl.
| | |
|---|---|
| H04N 21/2343 | (2011.01) |
| H04N 21/6373 | (2011.01) |
| H04N 21/845 | (2011.01) |
| H04N 21/442 | (2011.01) |
| H04L 29/06 | (2006.01) |

(52) U.S. Cl.
CPC ........ *H04N 21/23439* (2013.01); *H04L 65/604* (2013.01); *H04N 21/6373* (2013.01); *H04N 21/8456* (2013.01); *H04L 65/4084* (2013.01); *H04L 65/607* (2013.01); *H04N 21/44209* (2013.01)

(58) Field of Classification Search
CPC .................................. H04J 3/22; G06F 15/16
USPC ................................................. 709/231, 217
See application file for complete search history.

(56) References Cited

U.S. PATENT DOCUMENTS

| | | | |
|---|---|---|---|
| 5,361,332 A | 11/1994 | Yoshida et al. | |
| 5,404,436 A | 4/1995 | Hamilton | |
| 5,715,403 A | 2/1998 | Stefik | |
| 6,031,622 A | 2/2000 | Ristow et al. | |
| 6,064,794 A | 5/2000 | McLaren et al. | |
| 6,141,754 A | 10/2000 | Choy | |
| 6,155,840 A * | 12/2000 | Sallette | .......................... 434/323 |
| 6,195,388 B1 | 2/2001 | Choi et al. | |

(Continued)

FOREIGN PATENT DOCUMENTS

| | | |
|---|---|---|
| EP | 0813167 A2 | 12/1997 |
| WO | 2004102571 A1 | 11/2004 |

(Continued)

OTHER PUBLICATIONS

"IBM Closes Cryptolopes Unit," Dec. 17, 1997, CNET News, Retrieved from http://news.cnet.com/IBM-closes-Cryptolopes-unit/2100-1001_3206465.html, 3 pages.

(Continued)

*Primary Examiner* — Brian J Gillis
*Assistant Examiner* — Steve Lin
(74) *Attorney, Agent, or Firm* — Loza & Loza LLP; Gabriel Fitch

(57) ABSTRACT

In a client-server environment, adaptively streaming programs from a program listing includes using an interaction between a client-side GUI and a server-side storefront to select a primary program for presentation, streaming the primary program at a primary streaming rate, and presenting the streamed primary program at a quality consistent with the primary streaming rate. The adaptive streaming further includes determining a number of secondary programs and a corresponding secondary streaming rate for each, which is less than the primary streaming rate. The adaptive streaming includes negotiating authorization rights for the secondary programs, then streaming the number of secondary programs at their secondary streaming rates, while streaming and presenting the primary program.

36 Claims, 12 Drawing Sheets

(56) References Cited

U.S. PATENT DOCUMENTS

| | | |
|---|---|---|
| 6,658,056 B1 | 12/2003 | Duruoz et al. |
| 6,807,306 B1 | 10/2004 | Girgensohn et al. |
| 6,859,496 B1 | 2/2005 | Boroczky et al. |
| 6,944,621 B1 | 9/2005 | Collart |
| 6,956,901 B2 | 10/2005 | Boroczky et al. |
| 7,016,970 B2 * | 3/2006 | Harumoto et al. ............ 709/233 |
| 7,242,772 B1 | 7/2007 | Tehranchi |
| 7,340,528 B2 | 3/2008 | Noblecourt et al. |
| 7,478,325 B2 | 1/2009 | Foehr et al. |
| 7,499,938 B2 | 3/2009 | Collart |
| 7,991,156 B1 * | 8/2011 | Miller ......................... 380/201 |
| 8,023,562 B2 | 9/2011 | Zheludkov et al. |
| 8,046,453 B2 | 10/2011 | Olaiya |
| 8,054,880 B2 | 11/2011 | Yu et al. |
| 8,225,061 B2 | 7/2012 | Greenebaum |
| 8,233,768 B2 | 7/2012 | Soroushian et al. |
| 8,249,168 B2 | 8/2012 | Graves |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,311,115 B2 | 11/2012 | Gu et al. |
| 8,321,556 B1 | 11/2012 | Chatterjee et al. |
| 8,386,621 B2 | 2/2013 | Park et al. |
| 8,412,841 B1 | 4/2013 | Swaminathan et al. |
| 8,456,380 B2 | 6/2013 | Pagan |
| 8,472,792 B2 | 6/2013 | Butt et al. |
| 8,515,265 B2 | 8/2013 | Kwon et al. |
| 8,806,188 B2 | 8/2014 | Braness et al. |
| 8,914,534 B2 | 12/2014 | Braness et al. |
| 8,914,836 B2 | 12/2014 | Shivadas et al. |
| 2001/0036355 A1 | 11/2001 | Kelly et al. |
| 2002/0076112 A1 | 6/2002 | Devara |
| 2002/0087569 A1 | 7/2002 | Fischer et al. |
| 2002/0136298 A1 | 9/2002 | Anantharamu et al. |
| 2003/0002578 A1 | 1/2003 | Tsukagoshi et al. |
| 2003/0128296 A1 | 7/2003 | Lee |
| 2003/0152370 A1 | 8/2003 | Otomo et al. |
| 2003/0163824 A1 | 8/2003 | Gordon et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0024688 A1 | 2/2004 | Bi et al. |
| 2004/0031058 A1 | 2/2004 | Reisman |
| 2004/0136698 A1 | 7/2004 | Mock |
| 2004/0158878 A1 | 8/2004 | Ratnakar et al. |
| 2004/0255236 A1 | 12/2004 | Collart |
| 2005/0015797 A1 | 1/2005 | Noblecourt et al. |
| 2005/0038826 A1 | 2/2005 | Bae et al. |
| 2005/0114896 A1 | 5/2005 | Hug et al. |
| 2005/0193070 A1 | 9/2005 | Brown et al. |
| 2005/0193322 A1 | 9/2005 | Lamkin et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0078301 A1 | 4/2006 | Ikeda et al. |
| 2006/0129909 A1 | 6/2006 | Butt et al. |
| 2006/0173887 A1 | 8/2006 | Breitfeld et al. |
| 2006/0181965 A1 | 8/2006 | Collart |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047901 A1 | 3/2007 | Ando et al. |
| 2007/0083617 A1 | 4/2007 | Chakrabarti et al. |
| 2007/0086528 A1 | 4/2007 | Mauchly et al. |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0239839 A1 | 10/2007 | Buday et al. |
| 2007/0292107 A1 | 12/2007 | Yahata et al. |
| 2008/0101466 A1 | 5/2008 | Swenson et al. |
| 2008/0104633 A1 | 5/2008 | Noblecourt et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0192818 A1 | 8/2008 | DiPietro et al. |
| 2008/0195744 A1 * | 8/2008 | Bowra et al. .................. 709/231 |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0310454 A1 * | 12/2008 | Bellwood et al. ............. 370/477 |
| 2008/0310496 A1 | 12/2008 | Fang et al. |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 * | 2/2009 | Jung et al. ..................... 709/231 |
| 2009/0060452 A1 | 3/2009 | Chaudhri |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0290706 A1 | 11/2009 | Amini et al. |
| 2009/0293116 A1 | 11/2009 | Demello et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0058405 A1 | 3/2010 | Ramakrishnan et al. |
| 2010/0074324 A1 | 3/2010 | Qian et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0107260 A1 | 4/2010 | Orrell et al. |
| 2010/0111192 A1 | 5/2010 | Graves |
| 2010/0158109 A1 | 6/2010 | Dahlby et al. |
| 2010/0186092 A1 * | 7/2010 | Takechi et al. .................. 726/26 |
| 2010/0189183 A1 | 7/2010 | Gu et al. |
| 2010/0228795 A1 | 9/2010 | Hahn et al. |
| 2010/0235472 A1 | 9/2010 | Sood et al. |
| 2011/0047209 A1 | 2/2011 | Lindholm et al. |
| 2011/0055585 A1 | 3/2011 | Lee |
| 2011/0066673 A1 | 3/2011 | Outlaw |
| 2011/0080940 A1 | 4/2011 | Bocharov et al. |
| 2011/0082924 A1 | 4/2011 | Gopalakrishnan |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0142415 A1 | 6/2011 | Rhyu |
| 2011/0145726 A1 * | 6/2011 | Wei et al. ...................... 715/752 |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0197237 A1 * | 8/2011 | Turner ............................ 725/78 |
| 2011/0213827 A1 | 9/2011 | Kaspar et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0268178 A1 | 11/2011 | Park et al. |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon et al. |
| 2012/0016965 A1 * | 1/2012 | Chen et al. .................... 709/219 |

(56) References Cited

U.S. PATENT DOCUMENTS

| | | | |
|---|---|---|---|
| 2012/0023251 A1 | 1/2012 | Pyle et al. | |
| 2012/0093214 A1 | 4/2012 | Urbach | |
| 2012/0170642 A1 | 7/2012 | Braness et al. | |
| 2012/0170643 A1 | 7/2012 | Soroushian et al. | |
| 2012/0170906 A1 | 7/2012 | Soroushian et al. | |
| 2012/0170915 A1 | 7/2012 | Braness et al. | |
| 2012/0173751 A1 | 7/2012 | Braness et al. | |
| 2012/0179834 A1 | 7/2012 | Van Der Schaar et al. | |
| 2012/0254455 A1 | 10/2012 | Adimatyam et al. | |
| 2012/0260277 A1 | 10/2012 | Kosciewicz | |
| 2012/0278496 A1 | 11/2012 | Hsu | |
| 2012/0307883 A1 | 12/2012 | Graves | |
| 2012/0311094 A1 | 12/2012 | Biderman et al. | |
| 2013/0044821 A1 | 2/2013 | Braness et al. | |
| 2013/0046902 A1 | 2/2013 | Villegas Nunez et al. | |
| 2013/0061040 A1 | 3/2013 | Kiefer et al. | |
| 2013/0061045 A1 | 3/2013 | Kiefer et al. | |
| 2013/0166765 A1* | 6/2013 | Kaufman | 709/231 |
| 2013/0166906 A1 | 6/2013 | Swaminathan et al. | |
| 2013/0196292 A1 | 8/2013 | Brennen et al. | |
| 2014/0101722 A1 | 4/2014 | Moore | |
| 2014/0189065 A1 | 7/2014 | Van Der Schaar et al. | |
| 2014/0201382 A1 | 7/2014 | Shivadas et al. | |
| 2014/0250473 A1 | 9/2014 | Braness et al. | |
| 2014/0269936 A1 | 9/2014 | Shivadas et al. | |
| 2014/0280763 A1 | 9/2014 | Grab et al. | |
| 2014/0297804 A1 | 10/2014 | Shivadas et al. | |
| 2014/0297881 A1 | 10/2014 | Shivadas et al. | |
| 2014/0359678 A1 | 12/2014 | Shivadas et al. | |
| 2014/0359679 A1 | 12/2014 | Shivadas et al. | |
| 2014/0359680 A1 | 12/2014 | Shivadas et al. | |

FOREIGN PATENT DOCUMENTS

| | | | |
|---|---|---|---|
| WO | 2009065137 A1 | 5/2009 | |
| WO | 2010060106 A1 | 5/2010 | |
| WO | 2010122447 A1 | 10/2010 | |
| WO | 2011103364 A1 | 8/2011 | |
| WO | 2012094171 A1 | 7/2012 | |
| WO | 2012094181 A2 | 7/2012 | |
| WO | 2012094189 A1 | 7/2012 | |
| WO | 2013032518 A2 | 3/2013 | |
| WO | 2013032518 A3 | 3/2013 | |

OTHER PUBLICATIONS

"Supported Media Formats", Supported Media Formats, Android Developers, Nov. 27, 2013, 3 pgs.
European Search Report for Application 11855103.5, search completed Jun. 26, 2014, 9 pgs.
European Search Report for Application 11855237.1, search completed Jun. 12, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20, 1999, 3 pgs.
International Search Report and Written Opinion for International Application PCT/US2011/066927, International Filing Date Dec. 22, 2011, Report Completed Apr. 3, 2012, Mailed Apr. 20, 2012, 14 pgs.
International Search Report and Written Opinion for International Application PCT/US2011/067167, International Filing Date Dec. 23, 2011, Report Completed Jun. 19, 2012, Mailed Jul. 2, 2012, 11 pgs.
International Search Report and Written Opinion for International Application PCT/US2011/068276, International Filing Date Dec. 31, 2011, Report completed Jun. 19, 2013, Mailed Jul. 8, 2013, 24 pgs.
ITS International, "Fleet System Opts for Mobile Server", Aug. 26, 1999, 1 page.
Microsoft, Microsoft Media Platform: Player Framework, "Silverlight Media Framework v1.1", 2 pages.
Microsoft, Microsoft Media Platform:Player Framework, "Microsoft Media Platform: Player Framework v2.5 (formerly Silverlight Media Framework)", 2 pages.
The Official Microsoft IIS Site, Smooth Streaming Client, 4 pages.
"Adaptive Streaming Comparison", Jan. 28, 2010, 5 pgs.
"Best Practices for Multi-Device Transcoding", Kaltura Open Source Video, 13 pgs.
"IBM Spearheading Intellectual Property Protection Technology for Information on the Internet; Cryptolope Containers Have Arrived", May 1, 1996, Business Wire, Retrieved from http://www.thefreelibrary.com/IBM+Spearheading+Intellectual+Property+Protection+Technology+for...-a018239381, 6pg.
"Netflix turns on subtitles for PC, Mac streaming", 3 pgs.
"Thread: SSME (Smooth Streaming Medial Element) config.xml review (Smooth Streaming Client configuration file)", 3 pgs.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs.
Akhshabi et al., "An Experimental Evaluation of Rate-Adaptation Algorithms in Adaptive Streaming over HTTP", MMSys'11, Feb. 24-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2012, pp. 1-9.
Author Unknown, "Tunneling QuickTime RTSP and RTP over HTTP", Published by Apple Computer, Inc.: 1999 (month unknown), 6 pgs.
Deutscher, "IIS Transform Manager Beta—Using the MP4 to Smooth Task", Retrieved from: https://web.archive.org/web/20130328111303/http://blogjohndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages.
Inlet Technologies, "Adaptive delivery to iPhone 3.0", 2 pgs.
Inlet Technologies, "HTTP versus RTMP", 3 pages.
Inlet Technologies, "The World's First Live Smooth Streaming Event: The French Open", 2 pages.
Kaspar, Dominik et al., "Using HTTP Pipelining to Improve Progressive Download over Multiple Heterogeneous Interfaces", 2010, IEEE ICC proceedings, 2010.
Kim, Kyuheon, "MPEG-2 ES/PES/TS/PSI", Kyung-Hee University, Oct. 4, 2010, 66 pages.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Nelson, Michael "IBM's Cryptolopes," Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noé, Alexander, Matroska File Format (under construction Jun. 24, 2007, XP002617671, Retrieved from: http://web.archive.org/web/20070821155146/www.matroska.org/technical/specs/matroska.pdf, Retrieved on Jan. 19, 2011, pp. 1-51.

(56) References Cited

OTHER PUBLICATIONS

Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.

Pantos, R., "HTTP Live Streaming: draft-pantos-http-live-streaming-06", Published by the Internet Engineering Task Force (IETF), Mar. 31, 2011, 24 pgs.

RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.

Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pgs.

SIGLIN, "HTTP Streaming: What You Need to Know", streamingmedia.com, 2010, 15 pgs.

SIGLIN, "Unifying Global Video Strategies, MP4 File Fragmentation for Broadcast, Mobile and Web Delivery", Nov. 16, 2011, 16 pgs.

Wu, Feng et al., "Next Generation Mobile Multimedia Communications: Media Codec and Media Transport Perspectives", In China Communications, Oct. 2006, pp. 30-44.

Zambelli, Alex, "IIS Smooth Streaming Technical Overview", Microsoft Corporation, Mar. 2009.

\* cited by examiner

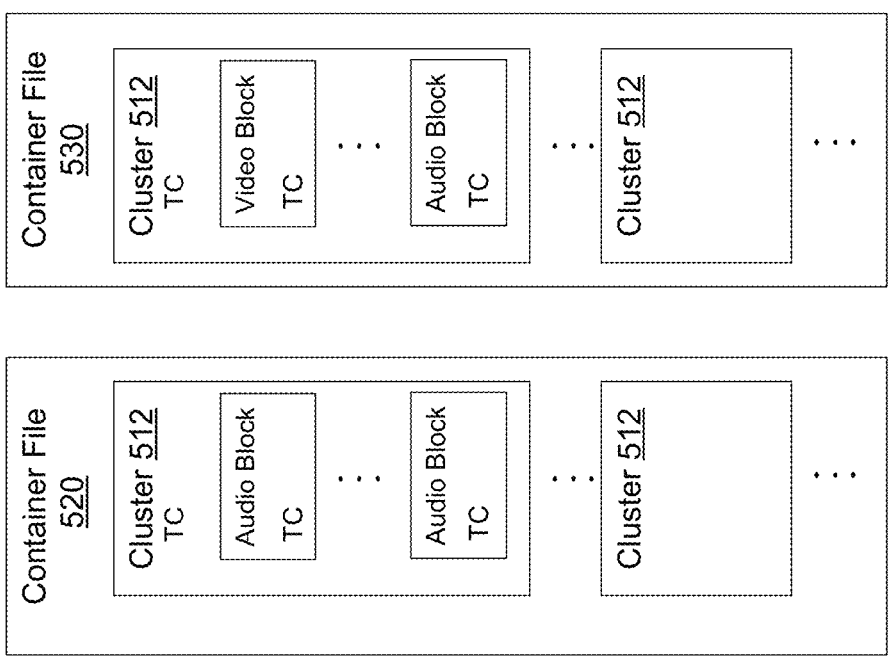
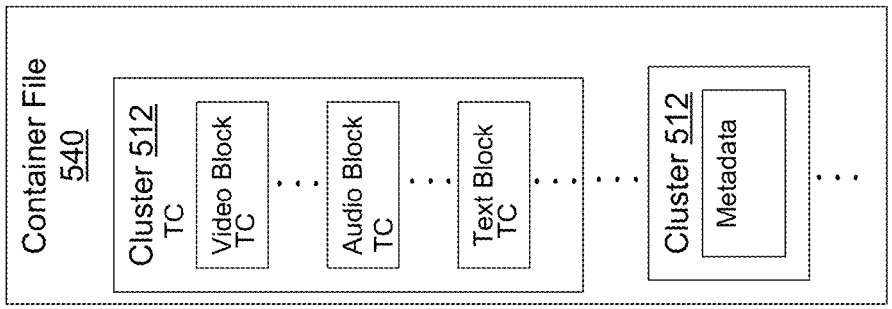
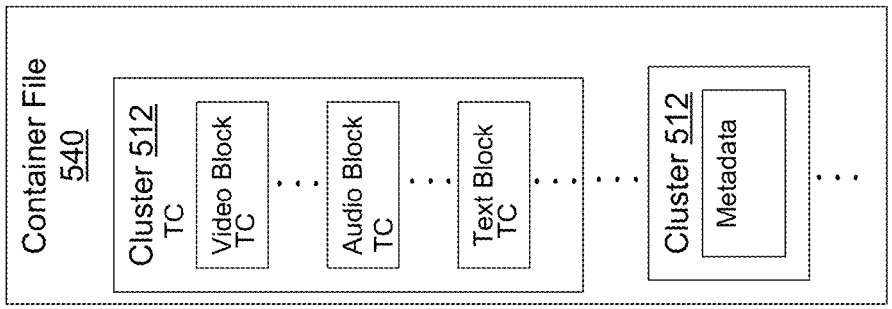

ADAPTIVE STREAMING OF MULTIMEDIA

BACKGROUND

Distribution of multimedia (also referred to herein as "media" and/or "program(s)"), such as movies and the like, from network services to a client device may be achieved through adaptive bitrate streaming of the media. Conventional adaptive bitrate streaming includes determining streaming conditions, e.g., an available streaming bandwidth at the client device, and then selecting a presentation quality of the streamed media accordingly. Typically, source media or programs may be encoded at different bitrates into multiple streams that are stored by the network services. Adjusting the presentation quality includes switching between the different streams, i.e., switching between the different bitrates, while streaming. Required streaming bandwidth and presentation quality increase and decrease as the encoded bitrates increase and decrease. Accordingly, more and less available streaming bandwidth may translate to more and less presentation quality, respectively. Given streaming bandwidth constraints at the client device, there is a persistent need to conserve bandwidth while streaming programs. Accordingly, conventional streaming techniques typically stream a single program at any given time to conserve bandwidth.

From the perspective of the network service, streaming a program includes transmitting the media for the program in response to requests from the client device. The streamed program may include previously recorded media or, alternatively, live media. From the perspective of the client device, streaming a program includes continuously requesting and receiving the media for the program from the network services, and storing the received media for the program in a buffer for subsequent presentation or playback, essentially, in near real-time, i.e., without having to download the entire stream prior to playback. The buffered program may be presented, i.e., played back, in audio-visual form, for example. To avoid an unwanted interruption in presentation while streaming, a sufficient quantity of the streamed program must be stored in the buffer to avoid emptying the buffer prior to receipt of a next portion of streamed program. Typically, several seconds-worth of a streamed program may need to be buffered in this manner prior to its presentation.

Typically, streaming of a program is initiated when a user selects a program from a channel guide presented to the user on the client device. Often, the user channel surfs, i.e., switches between programs (or channels) every few seconds in search of a preferred program on which to settle. At each switch, the client device must initiate the streaming of the new program. However, the client device may be required to negotiate authorization rights for the new program before it can be streamed. Such negotiation introduces an undesirable delay, namely, an authorization delay, between the program switch and when the new program may actually be streamed and presented to a user.

Additionally, at every program switch, buffering of the streamed program introduces further delay prior to presentation. That is, the buffering introduces an undesired buffer delay between when the user selects a new program for presentation and when that program is actually presented. Together, the buffer and authorization delays create an overall presentation delay that can be frustrating to a user when switching between programs, especially while program surfing.

BRIEF DESCRIPTION OF THE DRAWINGS/FIGURES

FIG. 5B is an illustration of a container file that encodes a single audio stream.

FIG. 5C is an illustration of a container file that encodes multiplexed audio and video streams.

FIG. 5D is an illustration of a container file that encodes multiplexed video, audio, text, and metadata streams.

Figure 1:
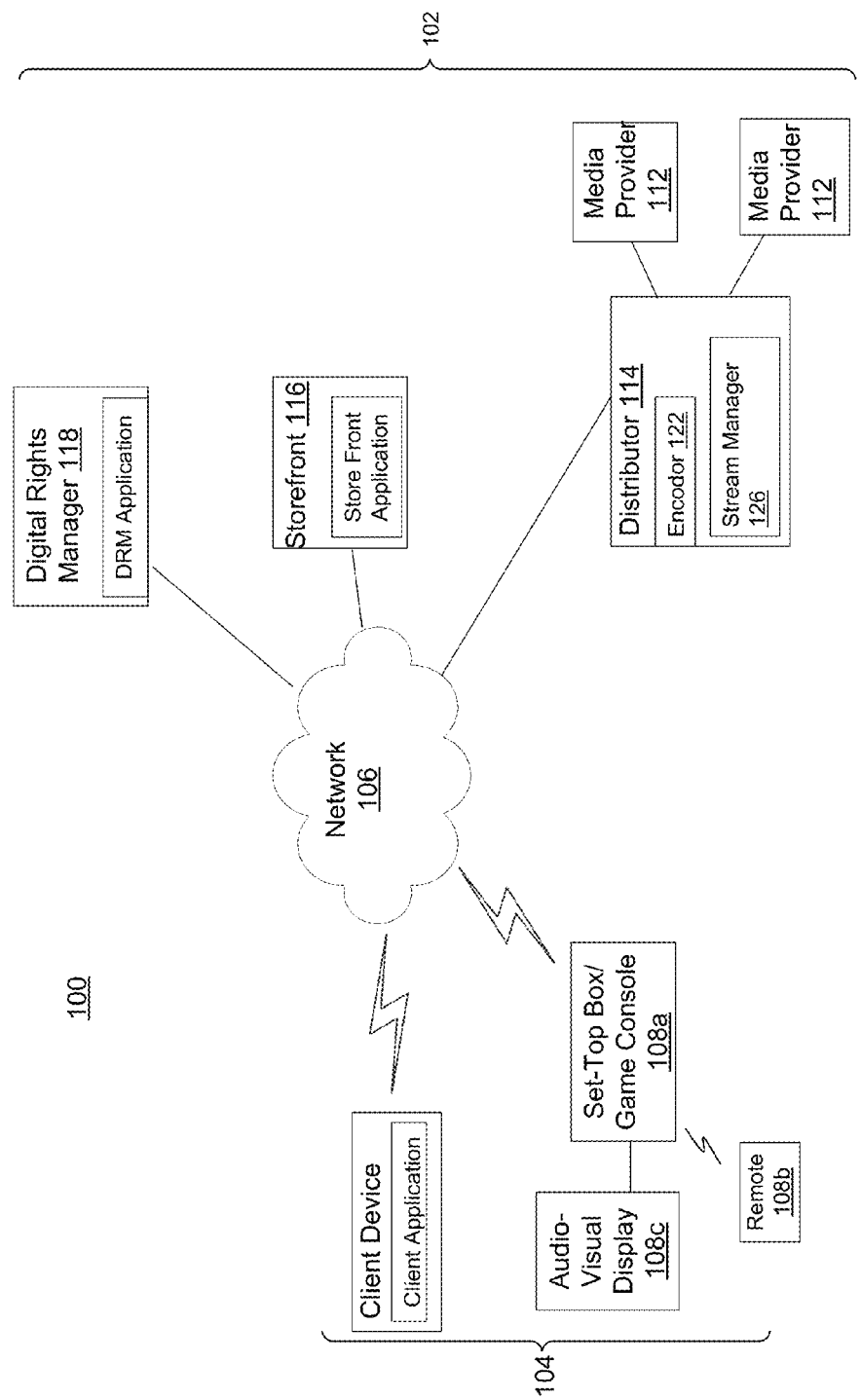
FIG. 1 is a block diagram of an example network environment in which adaptive streaming of multimedia (also referred to herein as "media" and "program(s)") from network services to a client device may be implemented.

In the drawings, the leftmost digit(s) of a reference number identifies the drawing in which the reference number first appears.

DETAILED DESCRIPTION

Described herein are techniques for adaptive streaming of programs from network services to a client device that conserve streaming bandwidth and improve a user experience at the client device. The adaptive streaming techniques described herein reduce the presentation delays that might otherwise occur when the user switches between program selections. Such programs include, but are not limited to, entertainment programs (e.g., television shows, movies, cartoons, news programs, etc.), educational programs (e.g., classroom video, adult education video, learning programs, etc.), and advertising programs (e.g., commercials, infomercials, or marketing content).

FIG. 1 is a block diagram of an example network environment 100 in which adaptive streaming of programs from network services to a client device may be implemented. Network environment 100 includes a collection of server-side services 102 that interact and cooperate to originate, manage, and distribute, e.g., stream, programs to a user operated client device 104 over one or more networks 106, such as the Internet. Network services 102 communicate with each other and with client device 104 using any suitable communication protocol, such as an Internet protocol, which may include Transmission Control Protocol/Internet Protocol (TCP/IP), Hypertext Transfer Protocol (HTTP), etc.

Client device 104 may be capable of wireless and/or wired communication with networks 106. Client device 104 includes processing, storage, communication, and user interface capabilities sufficient to provide all of the client device functionality described herein. Such functionality may be provided, at least in part, by one or more applications, such as computer programs, that execute on client device 104. Applications executed on client device 104 may include a client-side storefront application, which presents Graphical User Interfaces (GUIs) through which a user of the client device may interact with and request services from corresponding server-side applications hosted in services 102. Accordingly, under user control, client device 104 may request/select programs from services 102, stream the selected programs from the services, and then present the streamed programs, in other words, playback the streamed programs.

Client device 104 may include, but is not limited to, stand-alone equipment, such as personal computers, laptops, ultra-books, and tablets, and mobile phones and smartphones/Personal Digital Assistants (PDAs). Client device 104 may also include a suite of interconnected devices, such a set-top box/video game console device 108a, a remote 108b to operate device 108a, and an audio-visual display and/or computer 108c. Client devices 104 may further include (digital video disk) DVD and Blu-ray players, and televisions.

Network services 102 include, but are not limited to: one or more media provider(s) 112 to originate source programs; one or more media distributor(s) 114 to encode, store, and distribute the programs to client device 104; one or more storefront server(s) 116 to (i) link the client device with programs and services offered by the media providers, and (ii) assist the media providers with managing and providing access to their programs; and one or more digital rights manager(s) 118 to provide digital rights management across the programs. Each of the services 102 may be implemented as one or more computer servers that execute one or more associated server-side computer program applications suited to the given service.

Media providers 112, such as Netflix®, HBO®, cable networks, and so on, utilize network services 102 to manage and deliver their revenue bearing programs to client device 104. Media providers 112 download their source programs to distributor 114, which encodes, stores, and then streams the encoded programs to client device 104 when requested to do so.

Distributor 114 includes an encoder 122 and a stream manager 126. Encoder 122 may encode each program into a number of alternative streams to support adaptive bitrate streaming of the program. The alternative streams encode the same program in different ways, such as at one or more of different bitrates, one or more different resolutions, and/or one of more different frame rates. Encoder 122 may also encrypt the program using an encryption algorithm and one or more associated encryption keys. As will be described more fully below in connection with FIG. 5, each of the encoded (and encrypted) streams is typically stored in one or more container files. Encoder 122 also generates a program index file for the container files associated with the encoded program. Stream manager 126 manages streaming of the encoded program from the container files to client device 104 when the client device requests the program. Stream manager 126 cooperates with the requesting client device 104 to support adaptive bitrate streaming of the program from the container files to the client device.

Distributor 114 may also store auxiliary streams which contain information associated with the program streams mentioned above. The auxiliary streams are encoded at low bitrates, e.g., at bitrates of 200 kbps or much less. The auxiliary streams may include metadata synchronized in time with and descriptive of the content in associated main program streams. The metadata may include cues indicating or bracketing, e.g., commercial segments, or other non-program segments/content, interspersed throughout the program streams. The auxiliary streams may also include textual information, such as subtitles, time synchronized with video content in the program streams. Typically, such auxiliary streams would be streamed simultaneously with their associated program streams and handled appropriately at the client device.

One or more digital rights manger(s) 118 enable media providers 112 to provide digital rights management (DRM) over programs. DRM enables providers 112 to control access to their programs, e.g., limit access to authorized users/subscribers only. DRM information and parameters stored with digital rights manager 118 include, but are not limited to decryption keys necessary for decrypting programs encrypted by and stored at distributor 114, and content permissions tied to each client device 104/user, e.g., subscriber permissions based on, e.g., pay subscriptions.

Storefront server 116 hosts server-side storefront applications, each operated by a corresponding one of providers 112. These storefront applications generate server-side storefront websites, through which client device 104 may access programs and services. The server-side storefront applications and their websites (not to be confused with client-side storefront GUIs) are collectively referred to herein as "storefronts." The storefronts play a central role in managing access to programs in network environment 100. Typically, each of the storefronts is linked with a corresponding, or counterpart, client-side storefront application hosted on client device 104. The client-side storefront application generates client-side GUIs through which a user of the client device may interact with the counterpart server-side storefront to access programs and services.

Providers 112 program their respective storefronts to perform one or more of the following functions:

manage their programs and service offerings;

communicate with client-side storefront GUIs through user-friendly websites, e.g., browser enabled web pages;

monitor and record client device interactions with services 102 through the websites, to create historical program usage statistics over time; and interact with distributor(s) 114 and digital rights manager(s) 118 (described below).

As discussed above, client-side storefront GUIs provide a user with access to services and program offerings. Such client-side GUIs typically include easily navigable program guides, and may present programs and channel selection options, program descriptions, advertisements, programming/user control options, and other typical programming features, as would be appreciated by those of ordinary skill in the relevant arts. The client-side storefront GUIs accept user selections/requests, such as a request to view a program, switch from a currently viewed program/channel to a different program/channel, initiate parental controls, etc. In response to such GUI selections/requests, the client-side storefront application sends appropriate requests to the counterpart server-side storefront to initiate the appropriate actions among services 102 that will satisfy the client selections/requests.

Figure 2:
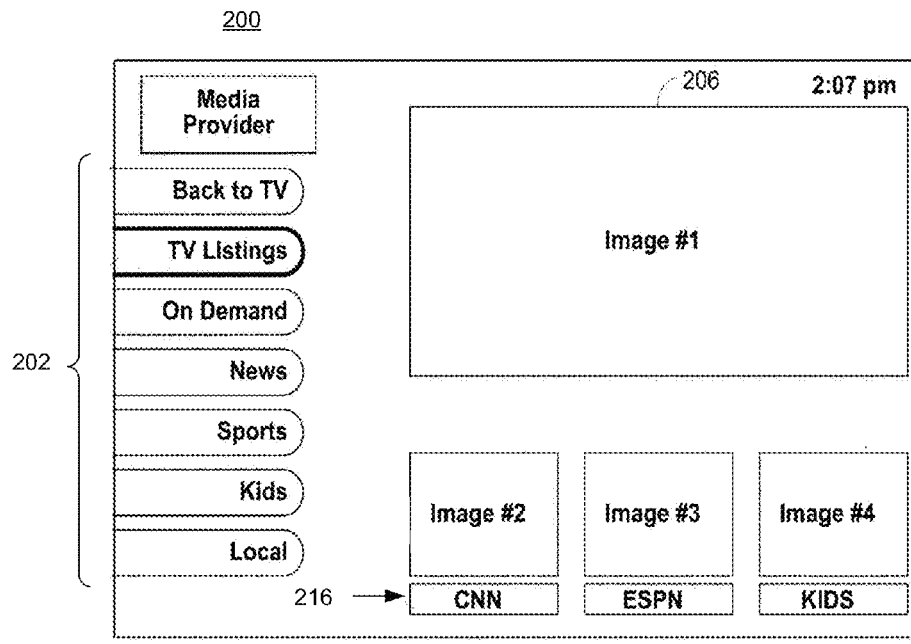
FIG. 2 is an example, high-level, client-side Graphical User Interface (GUI) from which a user of the client device may navigate to programs grouped under subject matter categories.
Figure 3:
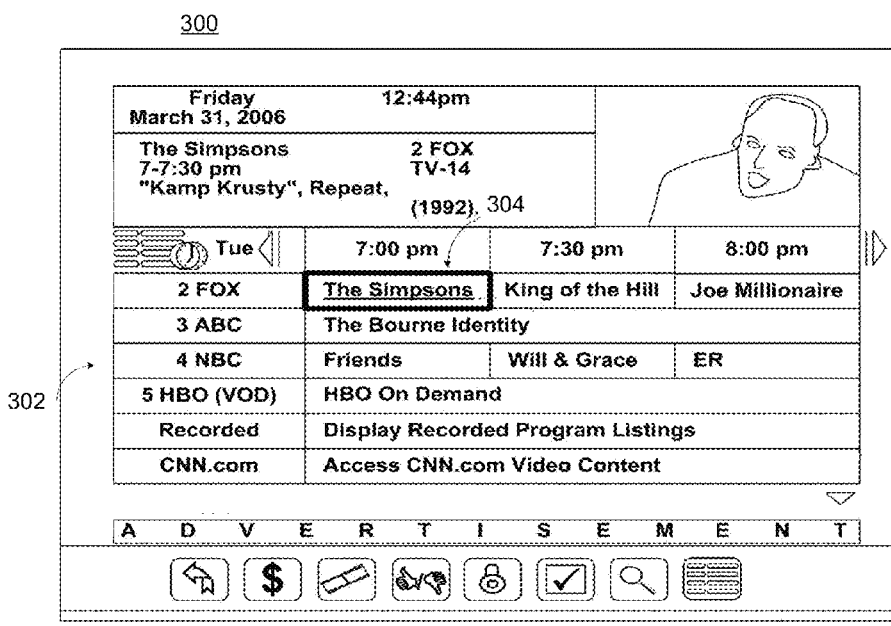
FIG. 3 is an example, low-level, client-side GUI generated as a result of a user selection in the GUI of FIG. 2.
Figure 4:
FIG. 4 is an example client-side Netflix® GUI.

FIGS. 2-4 present exemplary client-side storefront GUIs.

FIG. 2 is an example, high-level, client-side storefront GUI 200 from which a user of client device 104 may navigate to channels and program titles grouped under subject matter categories 202. GUI 200 presents a main channel image #1. GUI 200 also presents channel identities 216 and their corresponding small channel images #2-4. In GUI 200, the subject matter category "TV Listings" is highlighted for selection.

FIG. 3 is an example, low-level, client-side storefront GUI 300 generated as a result of "TV Listings" being selected in GUI 200. GUI 300 is a channel guide that presents a channel/program lineup in the form of a list of consecutive channels/programs 302 carrying corresponding programs (or program titles) 304, either of which may be selected for viewing by a user at the client device at which the GUI is displayed. Except for the terminal channel/program "2 FOX"/"The Simpsons," each channel/program is situated between groups of adjacent channels/programs. In GUI 300, a user may navigate horizontally and vertically among adjacent channels/programs.

FIG. 4 is an example client-side Netflix® GUI 400. A user may select a program for presentation from among a list of programs 404 presented in a user queue.

A user may traverse the program listings presented in the client-side GUIs, e.g., GUIs 300 and 400, in a "program/channel surfing" mode. While surfing, the user selects to view the available programs one program at a time, for a few seconds each, in search of a program on which to settle. In other words, the user dwells on each selected program for only a few seconds before switching to an adjacent program. Eventually, the user may dwell on a selected channel/program for a longer duration, while not-surfing. In response to each program selection, including program switches, client device 104 streams and presents the selected program for presentation. Adaptive program streaming embodiments described below minimize a presentation delay that might otherwise occur when a user switches between programs. That is, the adaptive streaming embodiments minimize a time delay between a time when a new program is selected for presentation, while a current program is being presented, and a time when the new program is actually presented.

As described above, distributor 122 encodes source programs from providers 112. To support adaptive bitrate streaming, distributor 122 may encode the source programs at multiple bitrates to produce multiple streams for each source program, as will be described more fully below in connection with FIG. 5. While streaming such encoded programs, client device 104 may switch between streams (and thus between encoded bitrates and corresponding streaming rates) according to conditions at the client device.

Figure 5A:
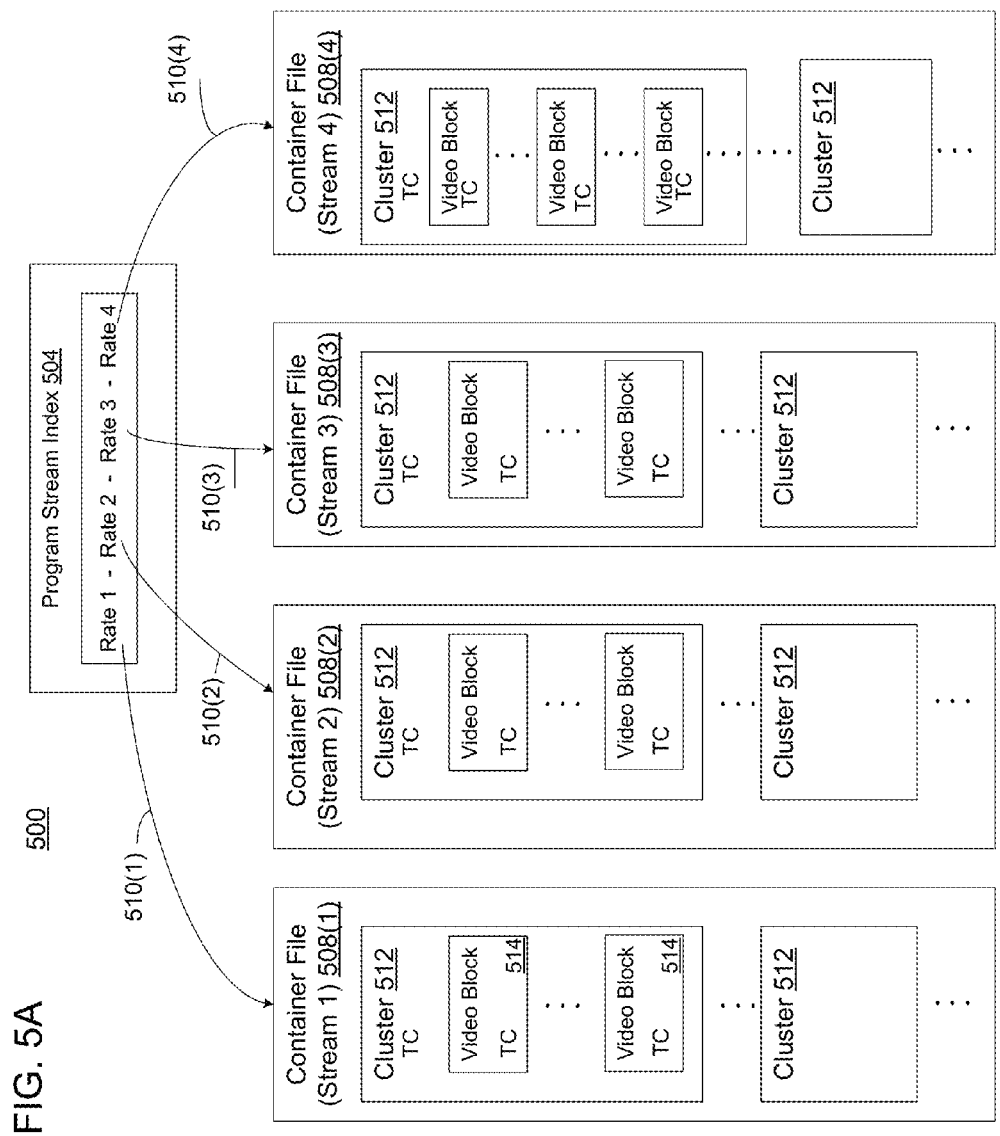
FIG. 5A is an illustration of an example encoded video program generated by a media distributor.

FIG. 5A is an illustration of an example encoded video program 500 generated by distributor 112. Encoded video program 500 includes multiple (encoded) video streams 1-4 encoded at multiple corresponding bitrates Rate 1-Rate 4. Encoded video program 500 includes a program stream index 504 and multiple container files 508(1)-508(4) corresponding to streams 1-4.

Program stream index 504 includes pointers 510(1)-(4), e.g., Uniform Resource Locators (URLs), to corresponding container files 508(1)-(4), and lists encoding parameters used to encode each of the streams 1-4, including, but not limited to, encoded bitrates Rate 1-Rate 4, encoding resolutions, frame rates, and encoding techniques/standards. Exemplary, non-limiting, bitrates may range from below 200 kilo-bits-per-second (kbps) up to 15,000 kbps, or even higher, depending on the type of encoded media.

Each of container files 508 comprises sequential clusters 512 of a larger media sector (not shown in FIG. 5), and sequential blocks 514 of encoded media (which may also include audio, text, multimedia, etc., in addition to video) within each of the clusters. Each cluster 512, and each block 514, includes a time code TC indicating a start time for the media encoded in the blocks of that cluster, and encodes a fixed duration of media. For example, each cluster 512 of container file 508(1) encodes two seconds of video. In other embodiments, each cluster may encode a different duration of media, which may vary from two seconds. Each cluster 512 is a self-contained unit of media that may be decoded and presented on client devices 504 without reference to any other clusters.

Container files may encode a single stream, such as a video stream (as depicted in FIG. 5A), an audio stream, or a text stream (e.g., subtitles). Alternatively, each container file may encode multiple multiplexed streams, such as a mix of video, audio, and text streams. FIGS. 5B-5D are further illustrations of diverse container files.

FIG. 5B is an illustration of a container file 520 that encodes a single audio stream.

FIG. 5C is an illustration of a container file 530 that encodes multiplexed audio and video streams.

FIG. 5D is an illustration of a container file 540 that encodes multiplexed video, audio, text, and metadata streams.

In addition, a container file may encode only a metadata stream at a relatively low bitrate.

The encoded container files depicted in FIGS. 5A-5D support adaptive streaming to client device 104. If conditions change while streaming, then client device 104 may switch between container files to stream at rates best suited to the conditions.

In embodiments: the container files may be Matroska containers based on Extensible Binary Meta Language (EBML), which is a derivative of Extensible Binary Meta Language (XML), or files encoded in accordance with the Moving Picture Experts Group (MPEG) standard; the program index may be provided in a Synchronized Multimedia Integration Language (SMIL) format; and client device 104 may implement adaptive streaming from distributor 114 over networks 106 using the HTTP protocol.

Figure 6:
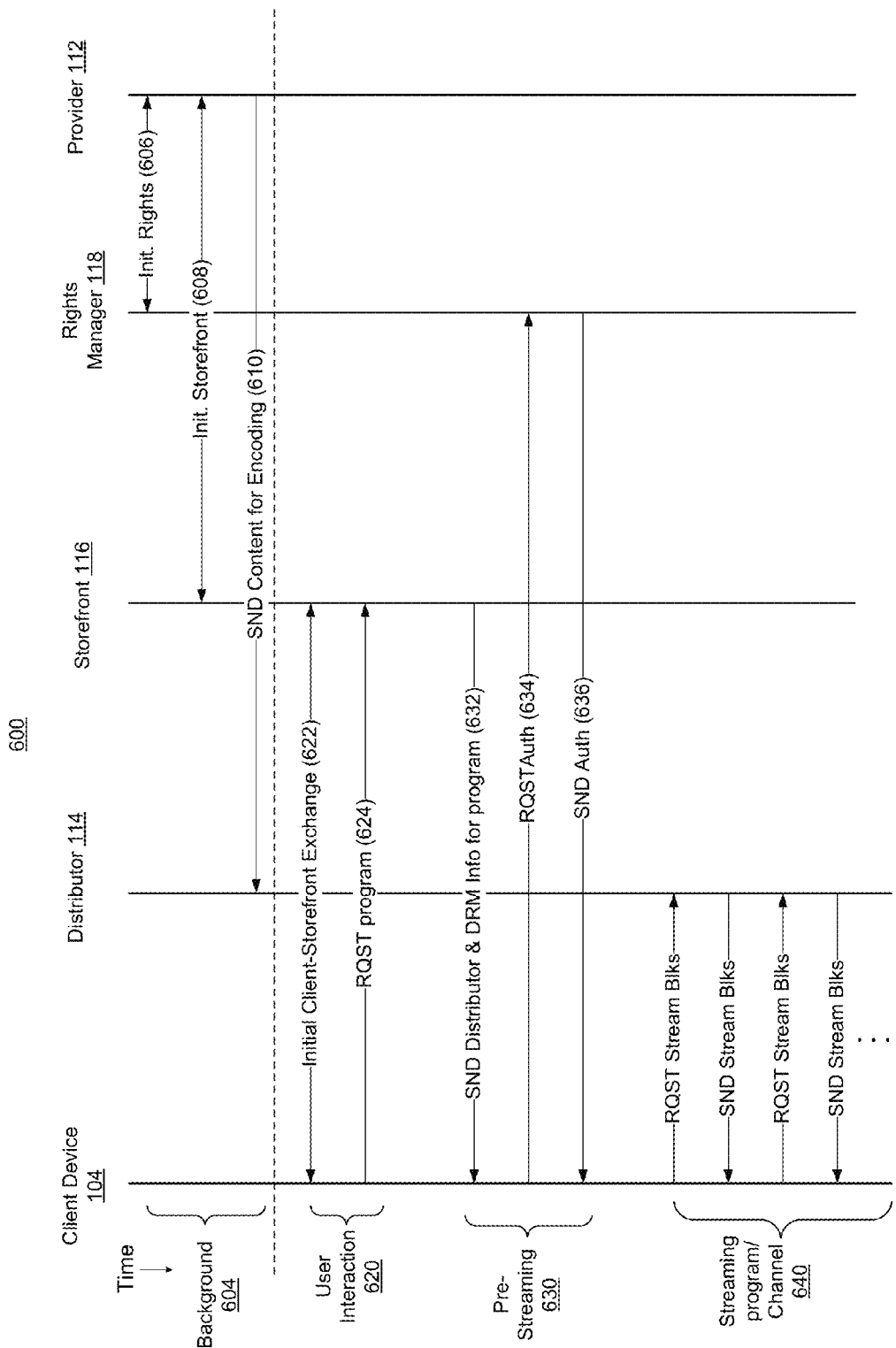
FIG. 6 is a sequence diagram of example high-level interactions among network services and the client device in the network environment of FIG. 1.

FIG. 6 is a sequence diagram of example high-level interactions 600 among network services 102 and client device 104 in network environment 100. Interactions 600 progress in time from top-to-bottom in FIG. 6, as a sequence of phases beginning with an initialization/set-up phase 604 indicated in the top left-hand corner of FIG. 6.

During initialization/set-up phase 604, at 606, provider 112 associates authorization rights, such as encryption keys, for various programs with subscribers, and stores the authorization rights in digital rights manager 118. At 608, provider 112 updates storefronts 116 with URLs, or the like, to the authorization rights stored in digital rights manager 118. At 610, provider 112 downloads source programs to distributor 114 for encoding, storage, and subsequent streaming to client devices 104.

During a user interaction phase 620, at 622, client device 104 presents client-side storefront GUIs to a user. At 624, the user selects a program from the GUIs, and, in response, client device 104 sends a request for the program to the corresponding server-side storefront hosted in storefront server 116.

During a pre-streaming phase 630, in response to the client device request (at 624), at 632, the server-side storefront sends URLs associated with the requested program to client device 104. The URLs include:

a first URL directed to a program index (e.g., index 504 in FIG. 5) for the encoded program corresponding to the requested program and stored in distributor 114; and a second URL directed to authorization rights, e.g., decryption keys, associated with the program in digital rights manager 118.

At 634 and 636, client device 104 negotiates with digital rights manager 116 for any required authorization rights, e.g., decryption keys, to the requested program. For example, at 634, client device 104 requests authorization rights, and, at 636, accesses the authorization rights, e.g., decryption keys, if permitted to do so, i.e., if the client device is authorized.

During a streaming phase 640, streaming of the requested program (also referred to herein as the primary program) from distributor 114 to client device 104 commences. Client device 104 determines a streaming bandwidth available at the client device and selects a stream from among the multi-bitrate streams, as indicated in the program index, that best matches the determined bandwidth. Client device 104 continually requests encoded stream blocks from distributor 114, and receives the requested blocks from the distributor. Client device 104 buffers the received blocks, decodes (and, if necessary, decrypts) the buffered blocks, and then presents the decoded blocks. As streaming conditions change, client device 104 may switch to a new stream, i.e., request blocks from another stream having a bitrate better suited to the changed conditions.

While streaming the primary program during streaming phase 640, client device 104 may also stream an auxiliary stream associated with the primary program stream. The auxiliary stream may be streamed simultaneously, and in a time synchronized manner with the program stream using, e.g., the time codes TC embedded in the program and auxiliary streams. The auxiliary stream may include text and/or metadata cues indicating, e.g., commercial segments, interlaced with program content in the program stream. In an embodiment, client device 104 may switch to a lower bitrate stream (and a correspondingly lower streaming rate) for the program stream when the auxiliary stream indicates to the client device that a commercial segment is being streamed in the program stream, which advantageously conserves streaming bandwidth.

In an embodiment to reduce undesired presentation delays, client device 104 authorizes and streams a number of additional programs (referred to herein as secondary programs) while the primary program is streamed and presented. Accordingly, pre-streaming (or authorization) phase 630 and streaming phase 640 are traversed for each of the secondary programs while the primary program is in its streaming phase 640 (and is being presented). The secondary programs may include programs adjacent to the primary program in a program lineup or guide because such programs, while not currently selected for presentation by the user, are most likely to be selected by the user for presentation next, or in the future, especially while channel surfing. The secondary channels are streamed, but not actually presented, until such time as they are selected for presentation, i.e., when the user actually switches from the primary channel to one of the secondary channels. An advantage of authorizing the secondary programs, while streaming and presenting the primary program, is that each of the secondary channels is, in a manner that is automatic and transparent to the user, authorized, buffered and ready for substantially immediate presentation at the time it is selected for viewing, thereby minimizing presentation delay when switching programs and improving user satisfaction.

Figure 7:
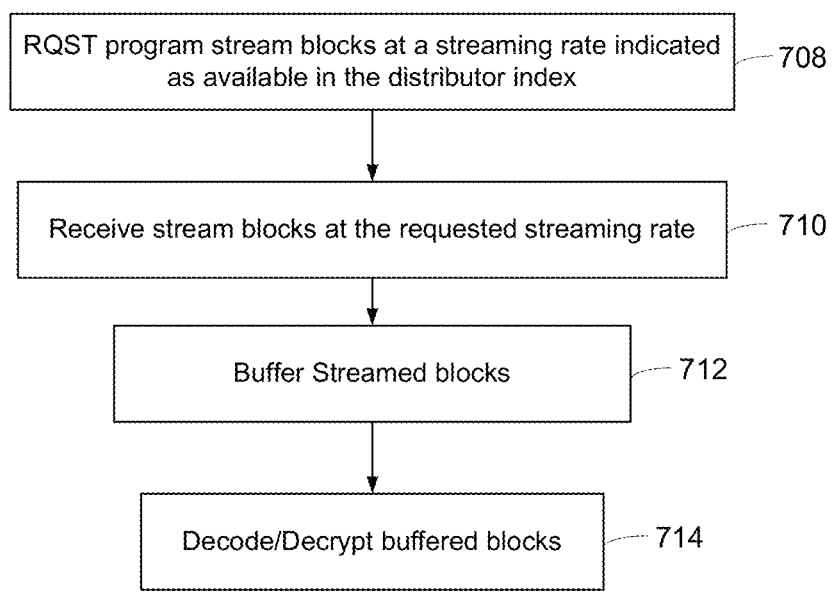
FIG. 7 is a flowchart of an example method of streaming a program.

FIG. 7 is a flowchart of an example method 700 of streaming a program, which may be performed at client device 104. The streamed program may be a primary program selected for presentation, or a secondary program, as discussed above in connection with streaming phase 640 of FIG. 6. It is assumed that prior to invoking streaming method 700, client device 104 has requested a program index (e.g., program index 504 in FIG. 5) for the program to be streamed, received the program index, determined a streaming rate at which the encoded program is to be streamed or downloaded to the client based on a variety of factors, and selected a stream from the program index that has an encoded bitrate rate as near as possible (e.g., preferably less than or equal) to the determined streaming rate. It is also assumed that client device 104 has negotiated authorization rights necessary to stream the program. As discussed above, the bitrate at which the program is encoded is referred to as the encoded bitrate. The data rate at which the encoded program is streamed or downloaded to (and received at) the client device is referred to herein as the streaming rate. The streaming rate is preferably greater than or equal to the encoded bitrate of the program being streamed.

For a primary program, client device 104 may determine the streaming rate based primarily on a bandwidth available for streaming at the client device. On the other hand, for secondary programs, client device 104 determines streaming rates based on other factors, described more fully below in connection with FIG. 8.

At 708, client device 104 requests consecutive stream blocks from the selected stream.

At 710, client device 104 receives the requested stream blocks.

At 712, client device 104 buffers the received stream blocks.

At 714, client device 104 decodes (and, if necessary, decrypts) the buffered stream blocks.

When streaming a primary program for presentation, client device 104 presents, e.g., displays, the buffered stream blocks.

When streaming secondary programs simultaneously with streaming and presenting the primary program, client device 104 does not present the buffered stream blocks for the secondary programs until such time that one of the secondary programs is selected for presentation.

In an alternative embodiment, the streamed secondary programs may be presented in a low-quality secondary display area while the streamed primary program is presented at a high-quality in a main or primary display area on the client device.

In an alternative embodiment that may reduce a processing load in client device 104, decoding at 714 may be omitted from streaming method 700, and performed instead just prior to presenting the buffered stream blocks on client device 104, i.e., performed as part of presentation. This saves processing when streaming the secondary programs while also streaming and presenting the primary program.

Figure 8:
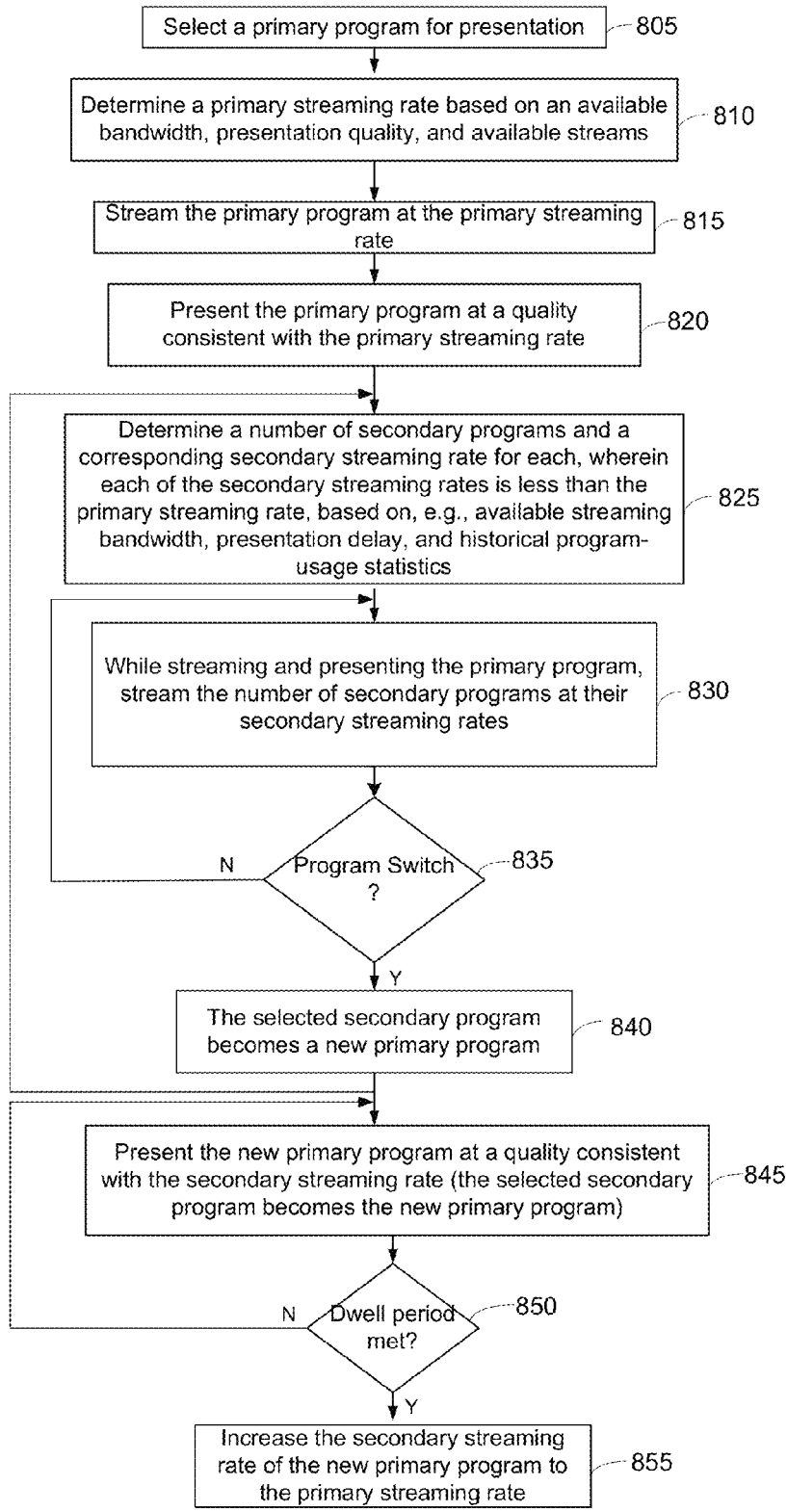
FIG. 8 is a flowchart of an example method of adaptive streaming of programs from the network services to the client device.

FIG. 8 is a flowchart of an example method 800 of adaptive streaming of programs from services 102 to client device 104, which may be performed in client device 104.

At 805, a primary program is selected for presentation, e.g., a user selects a program for presentation, client device 104 requests a corresponding program index, and receives the program index.

At 810, a primary streaming rate at which to stream the primary program is determined, based on such factors as, e.g., a bandwidth available for streaming, a desired presentation quality for the program, and encoded bitrates that the program index indicates as available.

At 815, the primary program is streamed at the primary streaming rate (see, e.g., method 700 described above in connection with FIG. 7).

At 820, the streamed primary program is presented at a quality consistent with the primary streaming rate.

At 825, a number, one or more, of secondary programs to be streamed simultaneously with the streaming and presentation of the primary program is determined. Also, a corresponding secondary streaming rate for each of the secondary programs is determined. A constraint is that each of the secondary streaming rates should be less than the primary streaming rate. The number of secondary programs and their streaming rates are determined based on, e.g., available streaming bandwidth remaining after streaming the primary program, a stored presentation delay, and stored historical program-usage statistics.

At 830, the determined number of secondary programs are streamed at their determined secondary streaming rates while the primary program is streamed and presented, i.e., simultaneously with the streaming and presenting of the primary program.

At 835 it is determined whether one of the secondary programs is selected for presentation.

If not, then 830 is repeated.

If it is determined at 835 that one of the secondary programs is selected for viewing, then, at 840, the selected secondary program becomes a new primary program. From 840, process flow branches to the following:

825 and 830 where new secondary programs, along with corresponding new secondary streaming rates, are determined (since one of the original secondary programs is now a primary program); and 845 where a program dwell timer is started and the new primary program is presented at a quality consistent with the secondary streaming rate at which the corresponding secondary program was streamed.

At 850, it is determined if the dwell timer has reached a predetermined dwell period. If not, then 845 is repeated.

If it is determined that the predetermined dwell period has been met, then at 855, the streaming rate of the new primary channel (which was originally a secondary channel) is increased from the original secondary streaming rate to the primary streaming rate, with a corresponding increase in presentation quality.

With actions required by the user to select/switch programs, e.g., at 805 and prior to 835, method 800 is performed automatically, i.e., without user intervention, and transparently with respect to the user of client device 104.

Figure 9:
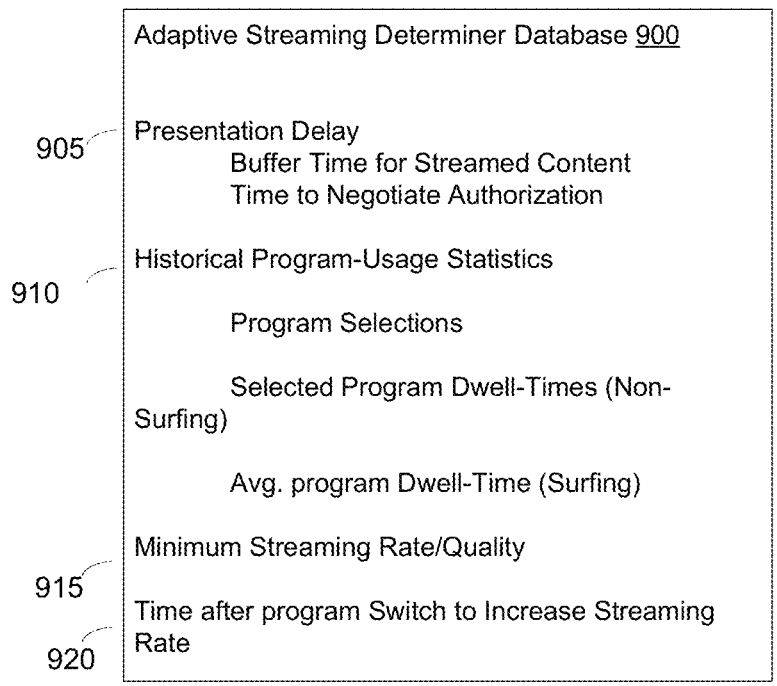
FIG. 9 is an illustration of an example database accessible to the client device and the network services.

FIG. 9 is an illustration of an example database 900 (also referred to herein as an "adaptive streaming determiner database") accessible to client device 104 and services 102 in network environment 100. Database 900 includes information used to determine streaming rates for primary and secondary programs in method 800.

Database 900 stores a presentation delay 905 (e.g., 6 seconds), based on an average time (e.g., 3 seconds) to buffer program media prior to its presentation, and an average time (e.g., 3 seconds) to negotiate authorization rights to stream a program. Such parameters may be determined empirically or by analysis and stored in database 900.

Database 900 also includes historical program/channel usage statistics 910 gathered over time, including:

program/channel selections made by a user;

selected program/channel dwell-times for each of the programs selected while not surfing, i.e., programs having dwell-times greater than a predetermined time period (e.g., 5 minutes); and an average program/channel dwell-time for surfing (e.g., 2 seconds).

Database 900 also includes a minimum acceptable streaming rate 915 (e.g., 200 kbps for video), and may also include a nominal streaming rate for presentation of video, e.g., 12,000 kbps.

Database 900 also includes a dwell-time-after-program-switch-to-increase streaming-rate 920, used, e.g., at 850 in method 800.

Figure 10:
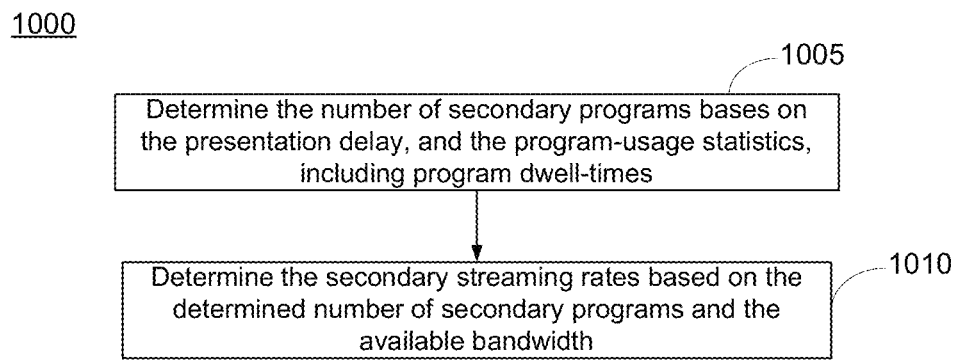
FIG. 10 is a flowchart of an example method expanding on the determining in the method of FIG. 8.

FIG. 10 is a flowchart of an example method 1000 expanding on the determining of 825 of method 800.

At 1005, the number of secondary programs is determined based on the stored presentation delay, and the stored historical program-usage statistics, including channel/program dwell times.

At 1010, the secondary streaming rates for the number of determined secondary programs is determined based the determined number of secondary programs (determined at 1005) on the bandwidth available for streaming after streaming the primary program.

Consider an example in which a client-side storefront GUI presents a channel lineup comprising 60 channels. The user selects to view a program carried on channel 10. This is the primary program. Then, client device 104: (i) determines that there is an available streaming bandwidth of 12,000 kbps; (ii) requests and receives a program index for the selected program indicating multiple streams, one of which has an encoded bitrate of 10,000 kbps; and (iii) commences to stream and present the 10,000 kbps stream. Therefore, the primary streaming rate is 10,000 kbps. This leaves an available streaming bandwidth of 2,000 kbps with which to stream secondary programs after streaming the primary program.

Next, client device 104 determines a number, N, of secondary programs based on parameters accessible in Adaptive Streaming Determiner database 900, e.g., presentation delay (PD) 905 (a combination of buffer time and the time to negotiate authorization rights), and one or more historical program-usage statistics 910, e.g., the average program-dwell-time-while-surfing (DT). For example, the number, N, may be determined as being proportional to the ratio PD/DT.

In an example where PD=6 seconds and DT is 2 seconds, the number, N, of secondary channels is proportional to 6/2=3. Because the user may surf secondary channels adjacent to and on either side of primary channel 10, in an embodiment, the number, N, of secondary programs is 3 secondary channels above channel 10 (i.e., channels 11, 12, and 13) and 3 secondary channels below channel 10 (i.e., channels 9, 8, and 7), i.e., 6 channels total.

Client device determines secondary streaming rates for the secondary programs based on the number, N, of determined programs, e.g., 6, and the streaming bandwidth available to stream the number of secondary programs after streaming the primary channel, e.g., 12–10 kbps=2 kbps. The secondary streaming rates may be determined simply by dividing the available bandwidth by the number, N, of secondary programs, e.g., 12 kbps/6=200 kbps.

Next, while the primary program is being streamed and presented, client device 104 negotiates authorization rights as necessary for each of the secondary programs, and, once authorized, streams each of the 3 channels on either side of channel 10 at a streaming rate of 2 kbps.

In an embodiment, client device 104 may adjust determined secondary streaming rates based on historical channel dwell-times while not surfing. Client device may determine relatively higher and lower secondary streaming rates for corresponding ones of the secondary programs having historical program-usage statistics indicating relatively higher and lower historical program dwell-times while non-surfing. Continuing with the example above, if the historical program-usage statistics 910 indicate that one of the 6 secondary channels had a historical program dwell-time less than the historical program dwell-times for the remaining 5 secondary programs, then client device 104 may reduce the streaming rate of the low usage secondary channel leaving further bandwidth to correspondingly increase the streaming rates of the remaining 5 high usage channels.

Figure 11:
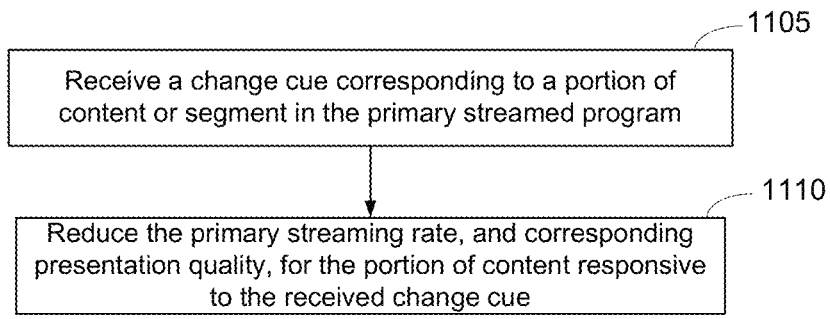
FIG. 11 is a flowchart of an example method of reducing a streaming rate of a streamed primary program in response to a change cue.

FIG. 11 is a flowchart of an example method 1100 of reducing a streaming rate of a streamed primary program in response to a change cue, such as a metadata cue. Method 1100 assumes a mechanism wherein a client device, e.g., client device 104, receives metadata associated and synchronized with the streamed primary program. The metadata may be streamed to the client device in an auxiliary stream having a low encoded bitrate.

At 1105, a metadata cue corresponding to a portion of content, i.e., a segment, in the streamed primary program is received. The metadata cue may indicate the commencement of a commercial segment interlaced in the streamed primary program.

At 1110, the streaming rate of the primary streamed program is reduced in response to the received metadata cue.

In an alternative embodiment, the change cue, e.g., the metadata cue, may be embedded in the primary stream, in which case the streaming rate is reduced once the embedded change cue is received in the primary program stream.

In another embodiment, client device 104 includes a change module, which may include computer program logic, to detect segments of embedded change content, e.g., commercial segments, in the streamed primary program. The change module may detect a volume increase or decrease above a threshold as a cue that a commercial segment has begun or ended, and indicate this to modules responsible for adaptive streaming. Other such indicators may be detected.

Figure 12:
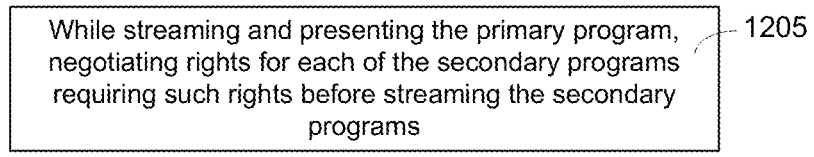
FIG. 12 is a flowchart of an example method of negotiating authorization rights for secondary programs prior to streaming the secondary programs.

FIG. 12 is a flowchart of an example method 1200 of negotiating authorization rights for secondary programs prior to streaming the secondary programs. Method 1200 may be performed before streaming the secondary programs at 830, e.g., while streaming and presenting the primary program at 815 and 820. In this way, such negotiation is transparent to the user, since the authorization rights are negotiated while the primary programs is being streamed and presented. At 1205 authorization rights are negotiated for streaming the secondary programs.

Methods and systems disclosed herein may be implemented with respect to one or more of a variety of systems including one or more consumer systems, such as described below with reference to FIGS. 13 and 14. Methods and systems disclosed herein are not, however, limited to the examples of FIGS. 13 and 14.

Figure 13:
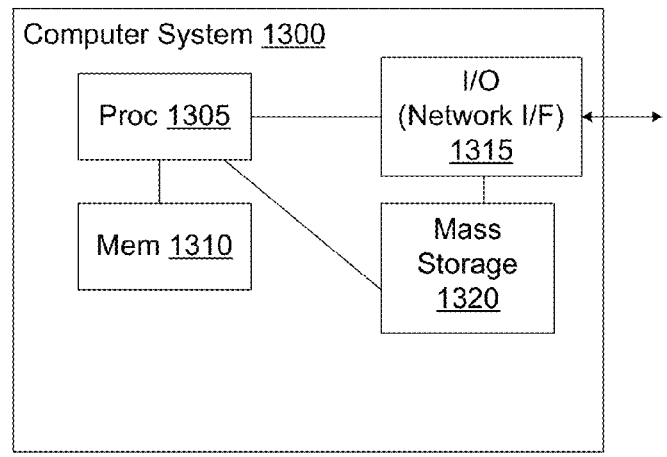
FIG. 13 is a block diagram of an example computer system corresponding to any of the network services in the network environment of FIG. 1.

FIG. 13 is a block diagram of an example computer system 1300 corresponding to any of services 102, including distributor 114, storefront 116, and digital rights manager 118. Computer system 1300, which may be, e.g., a server, includes one or more processors 1305, a memory 1310 in which instruction sets and databases for computer program applications are stored, a mass storage 1320 for storing, e.g., encoded programs, and an input/output (I/O) module 1315 through which components of computer system 1300 may communicate with networks 106.

Figure 14:
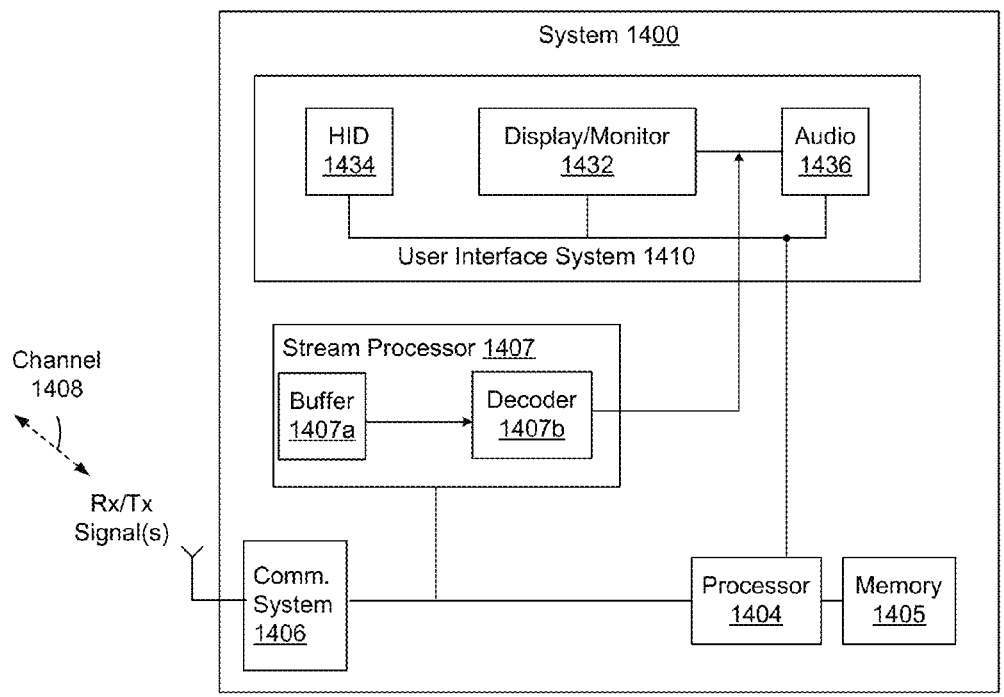
FIG. 14 is a block diagram of an example system, which may be implemented, and configured to operate, as described herein.

FIG. 14 is a block diagram of an example system 1400 representing, e.g., client device 104, and may be implemented, and configured to operate, as described in one or more examples herein.

System 1400 or portions thereof may be implemented within one or more integrated circuit dies, and may be implemented as a system-on-a-chip (SoC).

System 1400 may include one or more processors 1404 to execute client-side application programs stored in memory 1405.

System 1400 may include a communication system 1406 to interface between processors 1404 and communication networks, such as networks 106. Communication system 1406 may include a wired and/or wireless communication system.

System 1400 may include a stream processor 1407 to process program streams, received over channel 1408 and through communication system 1406, for presentation at system 1400. Stream processor 1407 includes a buffer 1407a to buffer portions of received, streamed programs, and a decoder 1407b to decode and decrypt the buffered programs in accordance with encoding and encryption standards, and using decryption keys. In an alternative embodiment, decoder 1407b may be integrated with a display and graphics platform of system 1400. Stream processor 1407 together with processors 1404 and memory 1405 represent a controller of system 1400. This controller includes modules to perform the functions of one or more examples described herein, such as a streaming module to stream programs through communication system 1406, a determiner module to determine secondary programs and their streaming rates, and an authorization and decryption module to negotiate authorization rights and decrypt programs as necessary prior to and while streaming System 1400 may include a user interface system 1410.

User interface system 1410 may include a monitor or display 1432 to display information from processor 1404, such as client-side storefront GUIs.

User interface system 1410 may include a human interface device (HID) 1434 to provide user input to processor 1404. HID 1434 may include, for example and without limitation, one or more of a key board, a cursor device, a touch-sensitive device, and or a motion and/or image sensor. HID 1434 may include a physical device and/or a virtual device, such as a monitor-displayed or virtual keyboard.

User interface system 1410 may include an audio system 1436 to receive and/or output audible sound.

System 1400 may correspond to, for example, a computer system, a personal communication device, and/or a television set-top box.

System 1400 may include a housing, and one or more of communication system 1406, processors 1404, memory 1405, user interface system 1410, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1402 may be implemented to receive a digital television broadcast signal, and system 1400 may include a set-top box housing or a portable housing, such as a mobile telephone housing.

Figure 15:
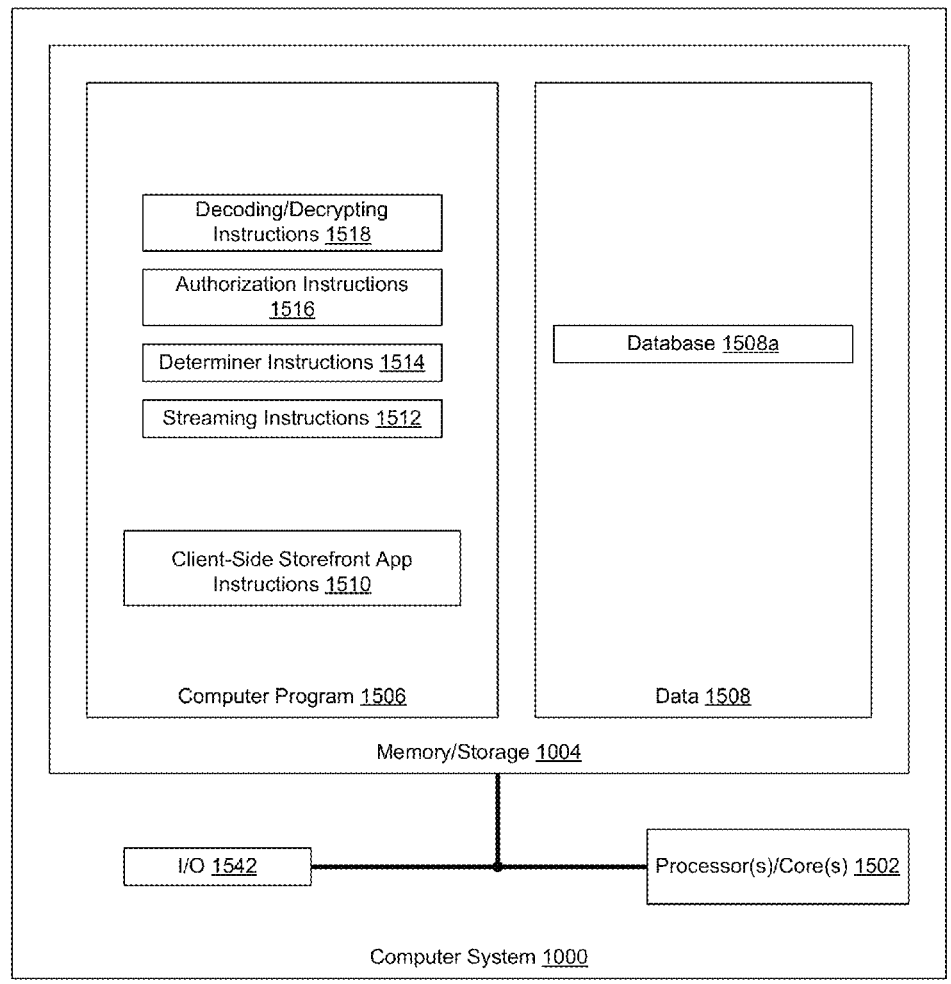
FIG. 15 is a block diagram of an example computer system configured to perform adaptive streaming as described herein.

FIG. 15 is a block diagram of a computer system 1500, configured to perform adaptive streaming as described herein.

Computer system 1500 includes one or more computer instruction processing units and/or processor cores, illustrated here as processor 1502, to execute computer readable instructions, also referred to herein as computer program logic.

Computer system 1500 may include memory, cache, registers, and/or storage, illustrated here as memory 1504, which may include a non-transitory computer readable medium encoded with computer programs, illustrated here as computer program 1506.

Memory 1504 may include data 1508 to be used by processor 1502 in executing computer program 1506, and/or generated by processor 1502 during execution of computer program 1506. Data 1508 includes a database 1508a, such as Adaptive Streaming Determiner database 900, containing parameters used in the methods described herein.

Computer program 1506 may include:

client-side storefront application instructions 1510 to cause processor 1502 to communicate with corresponding server-side storefronts, present corresponding client-side storefront navigable GUIs, permit a user to select programs for presentation, and present streamed programs;

streaming instructions 1512 to cause processor 1502 to stream selected programs as primary programs, and secondary programs;

determiner instructions 1514 to cause processor 1502 to determine a number of secondary programs, and streaming rates for the secondary programs;

authorization instructions 1516 to cause processor 1502 to negotiate authorization rights; and decoding and decryption instructions 1518 to cause processor 1502 to decode and decrypt streamed programs.

Instructions 1510-1518 cause processor 1502 to perform functions such as described in one or more examples above.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A method of adaptively streaming programs selectable from a program listing, comprising:

selecting, at a client device, a primary program for presentation;

streaming the primary program at a primary streaming rate;

presenting the streamed primary program at a quality consistent with the primary streaming rate;

determining, at the client device, a presentation delay including a time delay when buffering a streamed program prior to presentation thereof and when negotiating authorization rights for a program prior to streaming the program;

determining a number of secondary programs, based on the presentation delay and one or more historical program-usage statistics, and a corresponding secondary streaming rate for each, wherein each of the secondary streaming rates is less than the primary streaming rate; and streaming the number of secondary programs at their secondary streaming rates, while streaming and presenting the primary program.

2. The method of claim 1, wherein said determining the corresponding secondary streaming rate for each of the number of secondary programs is based on:

the determined number of secondary programs; and an available bandwidth to stream the determined number of secondary programs remaining after streaming the primary program.

3. The method of claim 2, wherein said determining the corresponding secondary streaming rate for each of the number of secondary programs further includes determining relatively higher and lower secondary streaming rates for corresponding ones of the secondary programs having historical program-usage statistics indicating relatively higher and lower historical program dwell-times while non-surfing.

4. The method of claim 1, wherein the one or more historical program-usage statistics includes an average program dwell-time while program surfing.

5. The method of claim 3, wherein the one or more historical program-usage statistics includes a non-surfing program dwell-time for presenting each of the secondary programs.

6. The method of claim 1, further comprising, each time one of the buffered, streamed secondary programs is selected as a new primary program for presentation:

determining a new number of new secondary programs and a new secondary streaming rate for each, wherein each of the new secondary streaming rates is less than the primary streaming rate; and streaming the new number of new secondary programs at their new secondary streaming rates, while streaming and presenting the new primary program.

7. The method of claim 1, further comprising:

selecting one of the buffered, streamed secondary programs as a new primary program for presentation;

presenting the new primary program at a reduced quality consistent with the secondary streaming rate of the selected secondary program; and increasing the streaming rate of the new primary program to the primary streaming rate after presenting the new primary program at the reduced quality for a predetermined period of time.

8. The method of claim 1, further comprising:

receiving a change cue corresponding to a segment in the primary streamed program; and reducing the primary streaming rate, and corresponding presentation quality, for the segment responsive to the received change cue.

9. The method of claim 8, wherein the change cue includes a metadata cue indicating the segment is a commercial break.

10. The method of claim 1, further comprising, while streaming and presenting the primary program, negotiating rights for each of the secondary programs requiring such rights before streaming thereof.

11. The method of claim 10, wherein said negotiating includes acquiring decryption information necessary for decrypting the streamed secondary programs when encrypted.

12. The method of claim 1, wherein the secondary programs include first and second groups of one or more programs adjacent the primary program in the program listing.

13. A non-transitory computer readable medium encoded with a computer program including instructions to cause a processor to:
   select, at a client device, a primary program for presentation from a program listing;
   stream the primary program at a primary streaming rate;
   present the streamed primary program at a quality consistent with the primary streaming rate;
   determine, at the client device, a presentation delay including a time delay when buffering a streamed program prior to presentation thereof and when negotiating authorization rights for a program prior to streaming the program;
   determine a number of secondary programs, based on the presentation delay and one or more historical program-usage statistics, and a corresponding secondary streaming rate for each, wherein each of the secondary streaming rates is less than the primary streaming rate; and
   stream the number of secondary programs at their secondary streaming rates, while the primary program is being streamed and presented.

14. The computer readable medium of claim 13, further including instructions to cause the processor to determine the corresponding secondary streaming rate for each of the number of secondary programs based on:
   the determined number of secondary programs; and
   an available bandwidth to stream the determined number of secondary programs remaining after streaming the primary program.

15. The computer readable medium of claim 14, wherein the instructions to cause the processor to determine the corresponding secondary streaming rate for each of the number of secondary programs further includes instructions to cause the processor to determine relatively higher and lower secondary streaming rates for corresponding ones of the secondary programs having historical program-usage statistics indicating relatively higher and lower historical program dwell-times while not program surfing.

16. The computer readable medium of claim 13, wherein the one or more historical program-usage statistics includes an average program dwell-time while program surfing.

17. The computer readable medium of claim 15, wherein the one or more historical program-usage statistics includes a non-surfing program dwell-time for presenting each of the secondary programs.

18. The computer readable medium of claim 13, further including instructions to cause the processor to, each time one of the buffered, streamed secondary programs is selected as a new primary program for presentation:
   determine a new number of new secondary programs and a new secondary streaming rate for each, wherein each of the new secondary streaming rates is less than the primary streaming rate; and
   stream the new number of new secondary programs at their new secondary streaming rates, while the new primary program is being streamed and presented.

19. The computer readable medium of claim 13, further including instructions to cause the processor to:
   select one of the buffered, streamed secondary programs as a new primary program for presentation;
   present the new primary program at a reduced quality consistent with the secondary streaming rate of the selected secondary program; and
   increase the streaming rate of the new primary program to the primary streaming rate after presenting the new primary program at the reduced quality for a predetermined period of time.

20. The computer readable medium of claim 13, further including instructions to cause the processor to:
   receive a change cue corresponding to a segment in the primary streamed program; and
   reduce the primary streaming rate, and corresponding presentation quality, for the segment responsive to the received change cue.

21. The computer readable medium of claim 20, wherein the change cue includes a metadata cue indicating the segment is a commercial break.

22. The computer readable medium of claim 13, further including instructions to cause the processor to, while the primary program is being streamed and presented, negotiate rights for each of the secondary programs requiring such rights before being streamed.

23. The computer readable medium of claim 22, further including instructions to cause the processor to acquire decryption information necessary for decrypting the streamed secondary programs when encrypted.

24. The computer readable medium of claim 13, wherein the secondary programs include first and second groups of one or more programs adjacent the primary program in the program listing.

25. A system at a client device for adaptive streaming of programs, comprising:
   a user interface system;
   a communication system to communicate with a network;
   a controller, including one or more processors and a memory, to interface with the communication system and the user interface system; and
   a housing to house the communication system, the controller, and the user interface system, wherein:
      the user interface system is configured to select, at the client device, a primary program for presentation from a program listing;
      the controller includes a streaming module configured to stream the primary program at a primary streaming rate;
      the user interface system is configured to present the streamed primary program at a quality consistent with the primary streaming rate;
      the controller includes a determiner module configured to:
         determine, at the client device, a presentation delay including a time delay when buffering a streamed program prior to presentation thereof and when negotiating authorization rights for a program prior to streaming the program, and
         determine a number of secondary programs, based on the presentation delay and one or more historical program-usage statistics, and a corresponding secondary streaming rate for each, wherein each of the secondary streaming rates is less than the primary streaming rate; and
      the controller streaming module is configured to stream the number of secondary programs at their secondary streaming rates, while the primary program is being streamed and presented.

26. The system of claim 25, wherein:
the communication system includes a wireless communication system; and
the housing includes a mobile hand-held housing to receive the user interface system, the communication system, the controller, and a battery.

27. The system of claim 25, wherein the determiner module is further configured to determine the corresponding secondary streaming rate for each of the number of secondary programs based on:
the determined number of secondary programs; and
an available bandwidth to stream the determined number of secondary programs remaining after streaming the primary program.

28. The system of claim 27, wherein the determiner module is further configured to determine relatively higher and lower secondary streaming rates for corresponding ones of the secondary programs having historical program-usage statistics indicating relatively higher and lower historical program dwell-times while not program surfing.

29. The system of claim 25, wherein the one or more historical program-usage statistics includes an average program dwell-time while program surfing.

30. The system of claim 25, wherein the one or more historical program-usage statistics includes a non-surfing program dwell-time for presenting each of the secondary programs.

31. The system of claim 25, wherein:
the user interface system is further configured to select one of the buffered, streamed secondary programs as a new primary program for presentation; and, when the new primary program is selected,
the determiner module is further configured to determine a new number of new secondary programs and a new secondary streaming rate for each when the new primary program is selected, wherein each of the new secondary streaming rates is less than the primary streaming rate, and
the streaming module is further configured to stream the new number of new secondary programs at their new secondary streaming rates, while the new primary program is being streamed and presented.

32. The system of claim 25, wherein:
the user interface system is further configured to select one of the buffered, streamed secondary programs as a new primary program for presentation;
the user interface system is further configured to present the new primary program at a reduced quality consistent with the secondary streaming rate of the selected secondary program; and
the streaming module is configured to increase the streaming rate of the new primary program to the primary streaming rate after presenting the new primary program at the reduced quality for a predetermined period of time.

33. The system of claim 25, wherein the streaming module is further configured to:
receive a change cue corresponding to a segment in the primary streamed program; and
reduce the primary streaming rate, and corresponding presentation quality, for the segment responsive to the received change cue.

34. The system of claim 33, wherein the change cue includes a metadata cue indicating the segment is a commercial break.

35. The system of claim 25, wherein the controller includes an authorizing module to negotiate rights for each of the secondary programs requiring such rights before being streamed further module, while the primary program is being streamed and presented.

36. The system of claim 35, wherein the controller includes a decryption module to acquire decryption information necessary for decrypting the streamed secondary programs when encrypted.

* * * * *